United States Patent
Kluft

(10) Patent No.: US 6,975,919 B2
(45) Date of Patent: Dec. 13, 2005

(54) MONITORING SYSTEM, METHOD FOR THE PROCESS-PARALLEL MONITORING OF COLLISION OR OVERLOAD SITUATIONS IN MACHINE TOOLS

(76) Inventor: Werner Kluft, Ellerstrasse, 43, 52078 Aachen (DE)

( * ) Notice: Subject to any disclaimer, the term of this patent is extended or adjusted under 35 U.S.C. 154(b) by 0 days.

(21) Appl. No.: 10/489,355

(22) PCT Filed: Sep. 12, 2002

(86) PCT No.: PCT/EP02/10243

§ 371 (c)(1),
(2), (4) Date: Aug. 25, 2004

(87) PCT Pub. No.: WO03/023528

PCT Pub. Date: Mar. 20, 2003

(65) Prior Publication Data

US 2005/0004699 A1    Jan. 6, 2005

(30) Foreign Application Priority Data

Sep. 12, 2001   (DE) ................................ 101 44 998

(51) Int. Cl.[7] .................. G06F 19/00; G06F 15/00; G05B 11/01
(52) U.S. Cl. .................. 700/177; 700/12; 700/26; 700/27; 700/51; 700/178; 702/183; 702/185; 702/187
(58) Field of Search .............................. 700/12, 13, 23, 700/26, 27, 30, 33, 49, 51, 175, 177, 178, 700/255; 702/179–187

(56) References Cited

U.S. PATENT DOCUMENTS 5,345,390 A * 9/1994 Greenip et al. ............. 700/175
5,819,202 A * 10/1998 Sato et al. .................... 702/33

* cited by examiner

*Primary Examiner*—Albert W. Paladini
*Assistant Examiner*—Sean Shechtman
(74) *Attorney, Agent, or Firm*—Diller Ramik & Wight

(57) ABSTRACT

In a monitoring system for the process-accompanying monitoring or detection of collision or overstress situations in machine tools (1), comprising a machine control (2) with one or more sensors (4) for detecting measured signals or measured signal curves, a monitoring means (6) in which a comparison of the measured signals or measured signal curves of at least one sensor (4) with stored monitoring thresholds is performed, and a bidirectional interface (8) between the monitoring means (6) and the machine control (2), it is provided that the monitoring means (6), apart from detecting collision or overstress situations in a machine tool (1) and transferring machine stop or machine reaction instructions to the machine control (2), also permanently stores the measured signals or measured signal curves of the sensors (4) as measured by the sensors (4) before, during and after a collision or overstress situation and the data and statuses of the machine control (2).

1 Claim, 1 Drawing Sheet

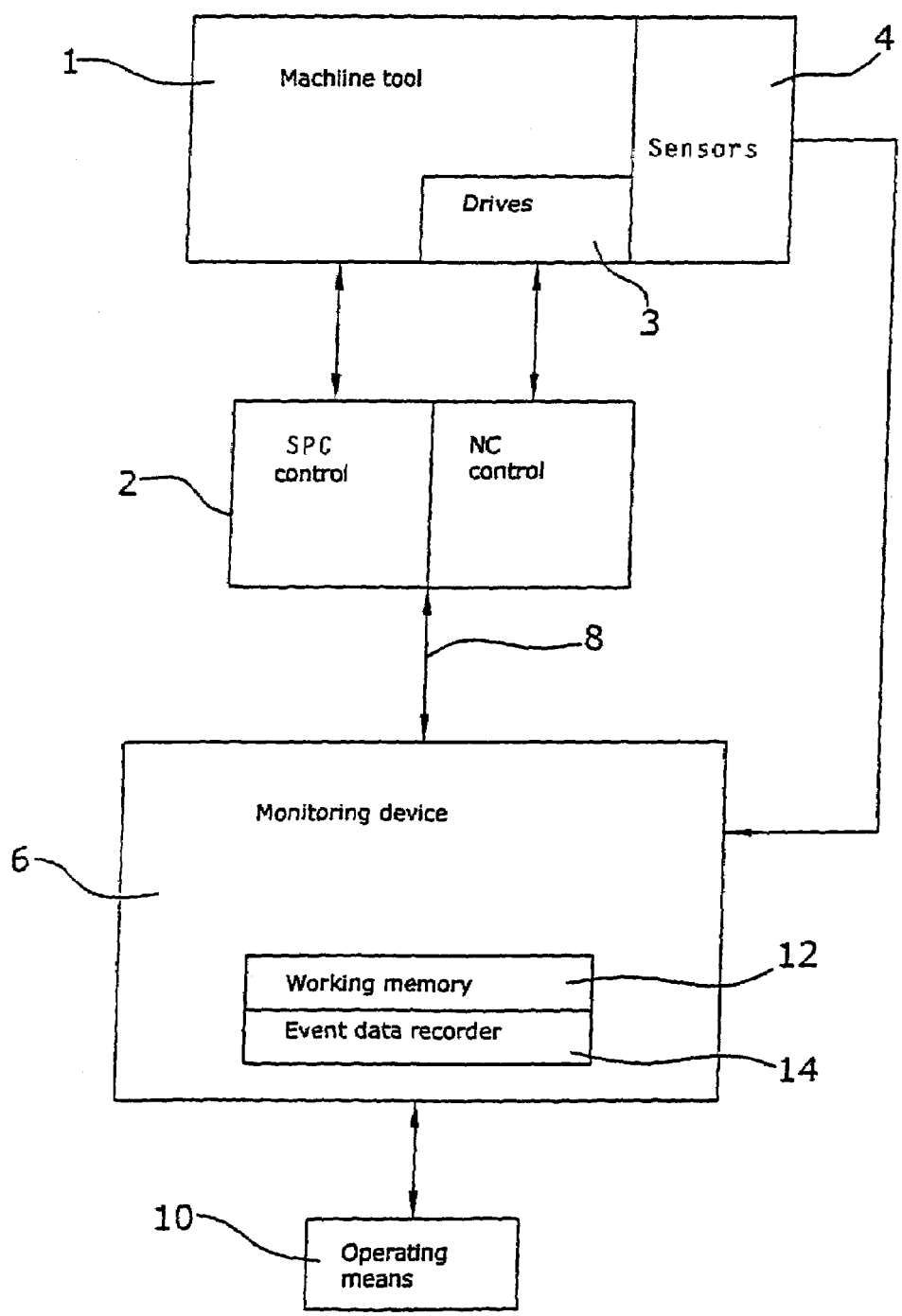

MONITORING SYSTEM, METHOD FOR THE PROCESS-PARALLEL MONITORING OF COLLISION OR OVERLOAD SITUATIONS IN MACHINE TOOLS

BACKGROUND OF THE INVENTION

The invention relates to a monitoring system for in-process monitoring of collision or overstress situations or conditions by means of event data recorders associated with machine tools.

Monitoring systems for the in-process monitoring of collision or overstress situations at machine tools are capable of detecting machine collisions in process and stopping the machine drives, mostly only the feed drives, as fast as possible to avoid consequential damage.

Such in-process monitoring systems are conventionally provided with an electric interface between the monitoring system and the machine control to monitor, in-process, the signals of the sensors in monitoring sections predetermined by the machine control and to stop the machine via the same interface if collision, overstress situations or tool breakage, for example, is detected. So far, the interfaces between the machine tool control and the monitoring system have been substantially provided in the form of parallel input and output signals for the SPC control.

Such a parallel interface between the SPC and a tool and in-process monitoring by a collision and overstress detection system exists, for example, according to the BAPSI standard (Brankamp-Artis-Prometec standard interface) which already allows for the transfer of data words as tool code or cutting code from the NC program to the monitoring system.

A known control of the Siemens Company comprises a so-called tachograph which logs operational processes. The latter control system is not started by a measured or detected collision or overstress event, but simply logs all operational processes, resulting in the disadvantage that other reasons for machine damage caused by collision are not detected.

SUMMARY OF THE INVENTION

It is an object of the invention to provide a monitoring system for in-process monitoring of collision or overstress situations at machine tools which, in case of a collision or overstress situation, not only intervenes into the machine control but moreover permits a later judgment of the causes of such a collision and overstress situation.

According to the invention, an in-process monitoring system is provided for the in-process monitoring or detection of collision or overstress situations by means of a large permanent memory forming an event data recorder, e.g., a flash disc, and preferably a field bus interface between the machine control and the monitoring system, in connection with a data transfer between the electric interface of the machine control and the monitoring system as well as in connection with a sensor signal supplying collision-relevant measured signals.

The invention provides the documentation of collision or overstress situations at machine tools by an event data recorder in order to securely detect the causes of such collision and overstress situations should they occur.

The invention is able to use the field bus interfaces (beside or instead of the parallel interfaces) only recently offered by the control manufacturers, which permits a more extensive exchange of information between the machine control that consists of the stored program control (SPC) or the NC control.

Such a system for documenting collision or overstress situations at machine tools by an event data recorder in order to securely detect the causes of such collision and overstress situations in the event they occur is presently unknown.

In case of a collision or overstress situation, it has not been possible, according to prior art, to later determine the causes that have led to the situation. Since the economic damage by machine shut-down or machine damage may be considerable in these cases, the detection of whether technical or human failure was the cause is of considerable economic importance.

Furthermore, the determination of the cause of damage permits the detection of defects in the machine components, or in the operational process, or mistakes of operating persons and avoidance thereof in the future.

The monitoring system for the in-process monitoring and detection of collision or overstress situations among machine components or of tools with machine components or workpieces or of workpieces with machine components or tools in machine tools at least consists of (a) one or more sensors for detecting measured signals or measured signal curves as may be produced at collisions, overstresses or damage to machine tools, which are to be equated with at least one direction of force, a resultant force, a pressure, a torque, a motor output, a motor current, even if it is taken from the values of the motor current sensor of the control, a vibration, an acceleration, a distance variation or a structure-borne noise, (b) a monitoring means consisting of monitoring hardware with software, wherein a comparison of the measured signals or measured signal curves of at least one sensor with stored monitoring thresholds is made by monitoring and evaluating strategies of a known and random type, such as static thresholds, dynamic thresholds, thresholds of signal pattern curves etc. in order to provide a corresponding report from the monitoring system to the machine control to immediately stop the machine tool or at least its feed drives, and (c) a bidirectional interface between the monitoring hardware and the machine control (consisting of the SPC and the NC control), which effects a data exchange between the machine and the monitoring system and is adapted, e.g., to activate the monitoring system via a signal as soon as a feed slide moves and even to transfer spindle-, tool- or even cutting specific monitoring sections in the form of data words as different numbers or instructions from the NC or SPC program to the monitoring system for the purpose of dividing the monitoring into different monitoring sections, and to transmit machine stop or at least machine reaction instructions to the machine control at the moment of detecting collisions or overstress situations.

Optionally, an operating means consisting of operating hardware with software for operating and/or parameterizing the monitoring system and/or for visualizing the measured signals may be provided.

Apart from detecting collision or overstress situations in a machine tool and transferring machine stop or machine reaction instructions to the machine control, the monitoring system of the invention is also capable of permanently storing (a) the measured signal data records (measured signals or measured signal curves) of the sensors as measured by the sensors before, during and after a collision or overstress situation and (b) the data and statuses of the machine control that are of interest as to the detection of the causes of a collision or overstress situation.

The measured signal data records of the sensors in the working memory or working storage of the monitoring system are continuously logged. Only at the detection of the collision or overstress are the measured data transferred into the permanent memory of the monitoring system.

The monitoring system continuously logs at least one measured signal data record (measured signal or a measured signal curve) of each of the sensors into the working memory or working storage.

Preferably, the monitoring system continuously logs two measured signal data records of each of the sensors into different working storage locations with respectively different resolutions as to time, referred to as "long" and "short". This means that one measured data record is stored in a small time window with high resolution and one measured data record is stored in a larger time window with lower resolution.

Upon detecting the collision or overstress situation, the measured signal data records are immediately transferred from the working memory into the permanent storage or permanent memory locations of the monitoring system and thus to the machine control together with the report of this situation.

The measured data records (measured signals or measured signal curves) to be filed in the permanent memory location and having the "long" resolution as to time preferably start about 2 seconds before the collision or overstress situation and end about 3 seconds thereafter.

The measured data records to be filed in the permanent memory location and having the "short" resolution as to time preferably start about 100 milliseconds before the collision or overstress situation and end about 150 milliseconds thereafter.

Immediately with the report of a collision or overstress situation from the monitoring system to the machine control, the latter begins, by means of an appropriate software, to detect data and statuses of the machine control that are of interest as to the detection of the causes of a collision or overstress situation and to transfer them to the monitoring system via the interface between the machine control and the monitoring system in order to write into the permanent memory thereof, which serves as an event data recorder, by means of the software of the monitoring system.

Preferably, the interface between the machine control and the monitoring system is a field bus interface, such as, for example, a process data highway or an interbus (as bidirectional interface).

At least one of the following data records and/or status parameters of the machine control is written into the permanent memory of the monitoring system with respect to the detection of the causes of a collision or overstress situation:
program name or number that has been active in the NC control,
record number where the NC program has been stopped by the monitoring systems,
present tool number in the form of the T or p number,
operational mode of the machine (setting, jog, automatic),
programmed tool correction values from the tool correction memory,
programmed zero point displacement,
setting of the override switch for feed,
setting of the override switch for spindle speed,
speed of the spindles,
programmed speed of the feed slides,
present speed of the feed slides,
programmed feed of the feed slides,
position or actual position values of the feed slides, and
date and time.

Immediately with the report of a collision or overstress situation from the monitoring system to the machine control, the monitoring system can write all states of the signals of the bidirectional interface between the monitoring system and the machine control, such as those according to the BAPSI standard, into the permanent memory thereof.

Immediately with the report of a collision or overstress situation from the monitoring system to the machine control, all monitoring-relevant data of the monitoring means, such as, for example, the position of the monitoring thresholds, the measuring ranges and gain degrees of the sensors, the characteristic values for filtering the measured signals, the monitoring mode, such as teach-in, setting etc., can be written in the permanent memory thereof.

All the measured signal curves, signals, data and statuses to be stored in the permanent memory of the monitoring system with respect to a detected collision or overstress situation belong to an unmistakable and marked data record.

All the measured signal curves, signals, data and statuses of a data record concerning a collision or overstress situation can be displayed and, if necessary, printed out by means of the operating means (operating hardware and software) for operating and/or parameterizing the monitoring system and/or visualizing the measured signals.

BRIEF DESCRIPTION OF THE DRAWING

The single sheet of drawing is a block diagram of the monitoring system of the present invention, and depicts the manner in which threshold and sensor-detected data are compared and utilized to generate an event detection signal which in conjunction with a bidirectional interface is utilized to control machine operation and through subsequent permanent storage and like permanent storage of machine control data and statuses can be utilized to readily determine the basis for machine tool collision and/or overstress condition.

DESCRIPTION OF THE PREFERRED EMBODIMENTS

The monitoring system for the in-process monitoring or detection of a collision or an overstress situation in a machine tool 1 with a machine control 2 shown in the drawing comprises at least one or more sensors 4 for detecting measured signal data records. The measured signal data records are supplied to a monitoring means 6 in which a comparison of the measured signal data records of at least one sensor 4 with stored monitoring thresholds is performed for detecting collision or overstress situations. In case of the measured signal data records violating the monitoring thresholds, the monitoring means 6 supplies a set of instructions to the machine control 2 in order to immediately stop the machine tool 1 or at least its feed drives 3.

The machine control is composed of a stored program control SPC for the machine tool 1 and a NC control for the drives 3. According to prior art, it is possible to bidirectionally exchange data and statuses between the stored program control SPC and the NC control.

Between the monitoring means 6 and the machine control 2, a bidirectional interface 8 is provided, effecting a data exchange between the machine tool 1 and the monitoring means 6.

The monitoring means 6 comprises a working memory 12 into which the monitoring means 6 continuously writes at least one measured signal data record of each of the sensors 4; in this connection, it is also possible that several measured signal data records of each of the sensors 4 are continuously written into different working memory locations of the working memory 12 with a respectively different resolution in time.

Apart from detecting collision or overstress situations in a machine tool 1 and transferring machine stop or machine reaction instructions to the machine control 2, the monitoring means 6 is also capable of storing the measured signal data records of the sensors 4 as measured by the sensors before, during and after a collision or overstress situation as well as the data and statuses of the machine control 2 in an event data recorder 14 consisting of a permanent storage or permanent memory, e.g., a flash disc.

Furthermore, the monitoring means 6 may be connected to an operating means 10. All measured signal curves, signals, data and statuses of a data record concerning a collision or overstress situation can be displayed and, if necessary, documented by printout by the operating means 10 for operating and/or parameterizing the monitoring system and/or visualizing the measured signal data records.

Although a preferred embodiment of the invention has been specifically described herein, it is to be understood that minor variations may be made in the invention without departing from the spirit and scope thereof, as defined by the appended claims.

What is claimed is:

1. A monitoring system for in-process monitoring of machine tool events comprising:

control means for controlling the operation of a machine tool and providing actual data and statuses of the control means, at least one sensor means for currently monitoring at least one of machine tool collision events and machine tool overstress condition events and providing current signal data, first means for storing said current signal data of the at least one sensor means for providing current signal data records of said at least one sensor means, second means for storing threshold data for each sensor means, means for comparing the current signal data of each sensor means and the respective threshold data for each sensor means for determining at least one of machine tool collision events and machine tool overstress condition events and upon exceeding at least one of the respective threshold signal data generating an event detection signal, bidirectional interface means for operating the control means to immediately control machine tool operation and to provide said actual data and statuses of the control means in response to the event detection signal, and means responsive to the event detection signal for permanently storing a data record of the event, consisting of the current signal data records of the first storing means immediately before, during and after the generation of the event detection signal and said actual data and statuses of the control means provided by said bidirectional interface whereby the cause of the at least one of the machine tool collision events and machine tool overstress condition events is readily determined on the basis of the said data record of the event.

* * * * *